United States Patent
Carstens (10) Patent No.: US 6,341,784 B1
(45) Date of Patent: Jan. 29, 2002

(54) MOTOR-DRIVEN STAIR CLIMBING DEVICE

(75) Inventor: Bernt Carstens, Neustadt (DE)

(73) Assignee: Otto Bock Orthopaedische Industrie Besitz-und Verwaltungs-Kommanditgesellschaft, Duderstadt (DE)

( * ) Notice: Subject to any disclaimer, the term of this patent is extended or adjusted under 35 U.S.C. 154(b) by 0 days.

(21) Appl. No.: 09/555,817

(22) PCT Filed: Nov. 17, 1998

(86) PCT No.: PCT/DE98/03378

§ 371 Date: Jun. 5, 2000

§ 102(e) Date: Jun. 5, 2000

(87) PCT Pub. No.: WO99/29554

PCT Pub. Date: Jun. 17, 1999

(51) Int. Cl.[7] .................................................. B62B 5/02
(52) U.S. Cl. ..................... 280/5.2; 280/5.32; 180/8.2; 180/8.3
(58) Field of Search .............................. 180/8.2, 8.3, 8.4, 180/8.5, 8.6, 8.7, 8.1; 280/DIG. 10, 5.2, 5.24, 5.32

(56) References Cited

U.S. PATENT DOCUMENTS

| | | | |
|---|---|---|---|
| 3,292,722 A | * 12/1966 | Bamberg | 180/9.24 |
| 3,346,268 A | 10/1967 | Richman | |
| 4,061,199 A | 12/1977 | Last | |
| 4,432,425 A | * 2/1984 | Nitzberg | 180/8 |
| 4,627,508 A | * 12/1986 | Auer | 180/9.22 |
| 4,687,068 A | * 8/1987 | Pagett | 180/8.2 |
| 4,688,813 A | * 8/1987 | Misawa et al. | 280/5.22 |
| 4,898,256 A | * 2/1990 | Lehner | 180/8.2 |
| 5,036,929 A | * 8/1991 | Trougouboff | 180/8.2 |
| 5,141,240 A | 8/1992 | Heilig | |
| 5,197,558 A | * 3/1993 | Misawa | 180/8.2 |

FOREIGN PATENT DOCUMENTS

| | | |
|---|---|---|
| DE | 1 024 367 | 2/1958 |
| DE | 3226294 C2 | 12/1988 |
| DE | 3713564 C4 | 5/1989 |
| FR | 2 574 740 | 12/1984 |
| WO | WO 90/00997 | 2/1990 |

* cited by examiner

Primary Examiner—Anne Marie Boehler
Assistant Examiner—Tony Winner
(74) Attorney, Agent, or Firm—Whitham, Curtis & Christofferson

(57) ABSTRACT

A motor-driven stair climbing device (10) to carry equipment and goods, more particularly wheel chairs (9) with disabled persons. The wheel chair (9) can be detachably fixed to the stair climber (10) and essentially comprises a stable frame (101) with an energy source (8.1, 8.2), a drive shaft (18), a drive control, feelers (7,131,132), sensors (7) and a lifting mechanism to climb the steps. The stair climbing device is characterized in that a support device (30, 33) is provided, which is supported on the following step of the stairs (1.2, 1.3) and in that the entire center of gravity (5) of the stair climber (10), the wheeler chair (9) and the disabled person is located between the support points of the running wheel (12) or the support device (30, 330) on the steps of the stairs (1.1, 1.2, 1.3).

37 Claims, 7 Drawing Sheets

MOTOR-DRIVEN STAIR CLIMBING DEVICE

The invention relates to motor-driven stair climbing devices for conveying equipment and goods, in particular wheelchairs with handicapped persons, in connection with which the wheelchair is attached removably to the stair climber, according to the introductory clause of claim 1.

Motor-driven stair climbing devices are known. Two construction principles are widely known for conveying wheelchairs with handicapped persons. One construction principle uses numerous wheels that rotate not only around their own axle but at the same time around an axle shared by all wheels. Cf. DE-C 37 13 564 or DE-C 32 26 294. On these devices, on the one hand it is advantageous that only rubber-tired wheels come into contact with the stairway and particularly the edge of the stairs, such that damage is largely ruled out; on the other hand, it is very dangerous that the wheels can only engage the steps to a limited depth. Operating these devices thus requires special cautious and circumspection, last but not least because the load consists of a person. In reality, however, stairways come in many designs: they range from relatively flat stairways running completely straight to narrow, steep winding stairways. Climbing stairways with stair climbers based on the multiple-wheel principle is not risk-free, because the apparatus can tilt over. The stair climber, the wheelchair and the person therefore have to be kept balanced by a strong operator.

The second widely known principle of construction uses two parallel crawlers. The crawlers are long enough that at least three stairs can be grasped at the same time. Accidental tipping over of the wheelchair and the person is thus no longer possible, thus eliminating falls with resulting injuries or even cases of death. Because of the length of the crawlers, however, these stair climbers have problems moving on narrow and curved stairways.

Finally, a stair climbing device has already been proposed that works with a spider-like leg system. However, such a device requires a highly complicated system of touch and position sensors and corresponding actuators that can only be controlled by means of a highly complex computer program in order to prevent the occurrence of missteps or dangerous inclinations of the platform carrying the wheelchair. A practical implementation of this spider leg principle is not yet known.

The present invention is based on the technical problem of indicating a stair climbing device of the type mentioned in the beginning that is not only so light and space-saving that it can be attached removably to any desired goods to be conveyed and in particular to wheelchairs, but also offers a particularly high degree of safety.

This technical problem is solved by a stair climbing device with the features of claim 1.

Thanks to the present invention, the stair climber always stands on two steps, namely either on the next steps or, if the stairway is not too narrow or too winding, on the steps after the next ones. The person operating the stair climber is thereby relieved as much as possible in terms of force; henceforth he/she only has guiding and steering tasks. Using the construction principle according to the invention, it would even be possible to build operator-free stair climbers.

A further advantage is that the support device can be built relatively short because it only needs to bridge over one or two stairs. Since it can also be built very narrow, narrowly winding stairways do not pose problems either.

According to an advantageous design of the invention, the support device is attached to the stair climber. In this way the object conveyed, in particular the wheelchair, remains unmodified.

According to a first design of the invention, the support device executes a linear lift movement. Linearly moving support devices can be one or more telescoping feet or also one or more scissor legs.

This action is comparable to a healthy person's climbing of stairs.

If the support device is designed advantageously in such a way that it can execute a swinging movement, in addition to the linear lift movement if necessary, this results in considerably greater flexibility with regard to the stairs to be climbed.

According to a first variant of this, a mounting system is provided on the stair climber or on the wheelchair; it is equipped with a hinge pin on which the support device is mounted swiveling. Provided between the support device and the mounting device is a braking and blocking device that is controlled by a sensor in such a way that it blocks the support device as soon as the stair climber threatens to topple over the stairway, and releases the support device as long as the stair climber is properly inclined relative to the stairway.

With this construction, under normal circumstances the support device is fully and freely movable relative to the stair climbing device or the object conveyed. In this way, it can be freely adapted to stairways of any steepness or flatness. Flat landings do not cause difficulties either. For conveying on level surfaces, the support device can even be folded up under the object conveyed, in particular the wheelchair. Only when the stair climber device takes up a position such that there is a danger of tilting over is the hinge of the support device blocked, namely until the operator has brought the stair climbing device back into a safe position.

Devices, preferably support feet made of an elastic, stairway-protecting material attached in the lower end area of the support device, advantageously provide a support action impacting largely vertically on the stepping surface of one of the next steps down when the swinging motion is blocked. It has been shown that the support on the stepping surface of the stairs is far safer and more reliable than support on the front edge of the stairs. The jolt caused when the hinge is blocked is thus optimally intercepted.

As an alternative to this, a continuous creeper band is attached at the free end of the support device. This creeper band is short enough that it only needs to bridge over two stairs. Also, only a single, narrow creeper band is needed in the middle of the stairway so that curve-negotiating characteristics are ensured.

According to a third variant, a turnstile with at least two, preferably three support wheels is attached at the free end of the support device. Constructions of a turnstile and support wheels are already used in stair climbing devices.

According to a fourth variant, a paternoster-like lift mechanism is attached to the support device.

According to an advantageous further development of the invention, there is the possibility for the foot or scissor leg executing a linear lift movement, the creeper belt, the turnstile or the paternoster to be motor-driven, preferably synchronized with the lift mechanism of the stair climber itself. In this case, the object conveyed, in particular the wheelchair, is conveyed up and down the stairs with only minimal vibrations. The operator henceforth only has a guiding function and no longer a holding function. Such stair climbers can thus be operated by less powerful persons. The constantly active braking and blocking system prevents the stair climber from tipping over with the wheelchair and the handicapped person in case of a danger.

According to a first variant, the braking and blocking system consists of a ratchet wheel and a ratchet as a heeling sensor. In this connection, the center of the ratchet wheel is preferably situated in the center of the hinge pin and the ratchet is designed as a pendulum and mounted swinging on the mounting device. As soon as the stair climber tips forward, the ratchet engages the teeth of the ratchet wheel and blocks the hinge. Such a blocking system is mechanically simple and operationally reliable.

In this regard, the ratchet advantageously consists of a low-mass part that quickly engages the ratchet wheel due to its low mass, and a high-mass part that is responsible for maintaining the vertical direction under the action of gravity. Both parts are held together by a spring which, however, is weak enough that it does not delay the ratchet's rapid engaging in the ratchet wheel.

In this regard, the angle of the ratchet wheel relative to the support device is advantageously adjustable. Shifting of the overall center of gravity brought about by the different dimensions and weights of the stair climber, the wheelchair and the handicapped person are thereby balanced out.

Another variant of the braking and blocking system consists of a lockable tension bar of finite length between the support arm on the one hand and the mounting device or stair climber on the other hand.

According to a third variant, a shoe brake is provided as the braking and blocking system.

According to a fourth variant, a spring band brake is provided as the braking and blocking system. These brakes operate very quickly and reliably and already have the necessary free-wheeling operation.

An electrical coupling or a shoe brake is also suitable.

According to another variant, the braking and blocking system is designed as a lockable cylinder piston unit. This is preferably a cylinder piston unit with an internal fluid circuit and, in the fluid circuit, a check valve controlled by the heeling sensor. Hydraulic oils as well as gases can be considered for the fluid.

According to an advantageous further development of the invention, there is a support spring between the support arm and the mounting plate or stair climber. This support spring must be designed in such a way that it is powerless when the stair climbing device is in the properly inclined position relative to the stairway. If the stair climber leans backward toward the stairway, the spring presses it back into the normal position. If the stair climber tends to tilt dangerously forward, the spring draws it back into the correct position. The support spring thereby relieves the operator's strength in both cases.

To further relieve the operator and to also be able to convey heavy loads quickly and, above all, safely over the stairway, a drive is provided parallel to the braking and blocking system. This can be an electric motor with gears, a hydraulic cylinder, an electric cylinder or the like. In each case, the drive is controlled contingent upon the differences between the desired values and actual values of the position of the support device relative to the stair climber and/or of the pressure forces of the support device on the stairway.

It is clear that considerable space and weight can be spared if, according to a further development, the drive is integrated into the braking and blocking system.

Several variants of construction are also possible for the lift mechanism of the stair climber itself.

According to a first variant, the lift mechanism essentially comprises a straight-line mechanism, a lifting frame mounted movably on it and at least one flap mounted on the lift frame and able to be swung in and out. A continuous chain with a push lever between the chain and the flap is provided as the drive source for the flap. Support feet of a nonskid, stairway-protecting material on the lower edge of the flap complete the construction.

An electric motor with gears is preferably suitable as the drive source.

According to a second variant, the lift mechanism essentially comprises two continuous chains circling parallel and in paternoster-like manner, at least one foot element on each chain and an electric motor with gears as the drive source, and the foot elements stand on the stairway. Such a construction requires relatively little power, and this clearly relieves the source of electric power carried on the stair climber. There is only little load on the material, such that the overall construction can be designed particularly easily.

The foot elements preferably stand with a rounded edge on the stairway. If the foot elements also have a nonskid, abrasion-proof coating, optimal conditions are obtained.

Safety is obviously optimal when the stair climber is drawn as far as possible into the stair. To ensure this, feelers in the form of contact bars are attached on the rear of the stair climber on the right and left; they are actuated only when the stair climber is standing at the next stair edge upward. Only then is the drive source activated for the next climbing lift.

Other sensors measure the upper and lower end position of the flap, the lift frame or the foot elements. In this way, it is ensured that each lift step, whether up or down the stairs, starts from a defined position of the lift mechanism and ends at a defined position.

The proper process control of all drives, i.e. the lift mechanism on the stair climber, the drive on the support device and, where applicable, the drive between the stair climber and the support device, is best ensured by a microprocessor.

With the help of the drawings, the invention will be described in greater detail in the form of examples of construction. They show.

Figure 1:
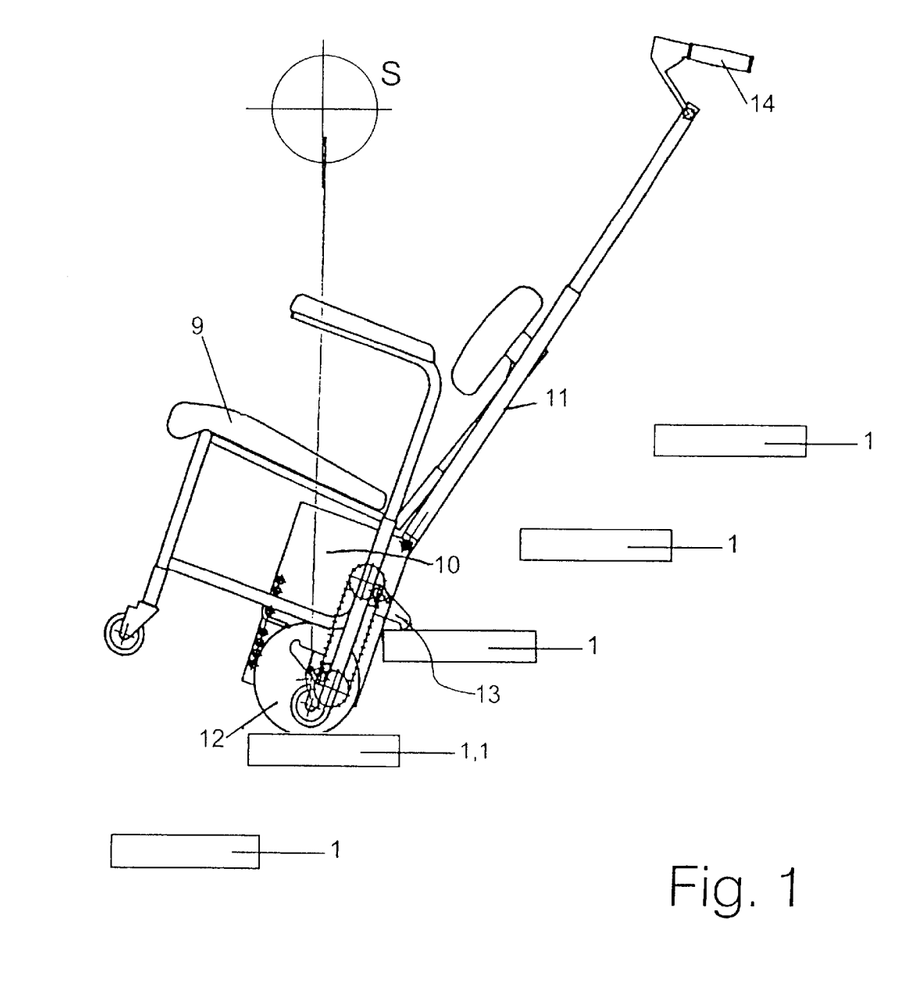
FIG. 1 in a schematic diagram, the side view of a stair climber with a wheelchair on a stairway, FIG. 2 a view of a section of the stair climber of FIG. 1 with a first support device, FIG. 3 in cutout form, a schematic diagram of the side view of a second stair climber with a second support device and with a wheelchair on a stairway, FIG. 4 in cutout form, a schematic diagram of the side view of the stair climber of FIG. 1 with a third support device, FIG. 5 a schematic side view of a stair climber with wheelchair and a fourth support device, FIG. 6 a schematic side view of a stair climber with wheelchair and a fifth support device, FIG. 7 a partly broken side view of the stair climber of FIG. 1 enlarged, FIG. 8 a vertical section of the stair climbing device of FIG. 7 and FIG. 9 a view of the rear of the stair climbing device according to FIGS. 7 and 8.

FIG. 1 shows in a schematic side view a stair climbing device 10 with attached wheelchair 9, standing on a stairway 1. The stair climbing device stands with its running wheels 12 on a stair. In this case, for example, a paternoster-like device 13 is illustrated as the lift mechanism for conveying the wheelchair 9 up and down the stairs. In principle, however, all types of comparable lift mechanisms as described in the other figures are suitable. Handles 14 on an operating rod 11 enable the operator to lean the stair climber 10, the wheelchair 9 and the disabled person far enough backward to situate the overall center of gravity S of this combination precisely above the axle of the running wheels 12, to hold the combination in this position and guide it up and down the stairs.

As soon as the lift device 13 becomes active, the running wheels 12 lose contact with the stairway 1. In this way, the center of gravity S is now situated in front of the bearing of the stair climber 10 on the stairway 1. The stair climber 10, the wheelchair 9 and the handicapped person are in danger of falling forward over the stairway 1. The operator must prevent this by pulling on the handles 14 with appropriate forcefulness. Practical experience has unfortunately proven that this is not always possible.

Figure 2:
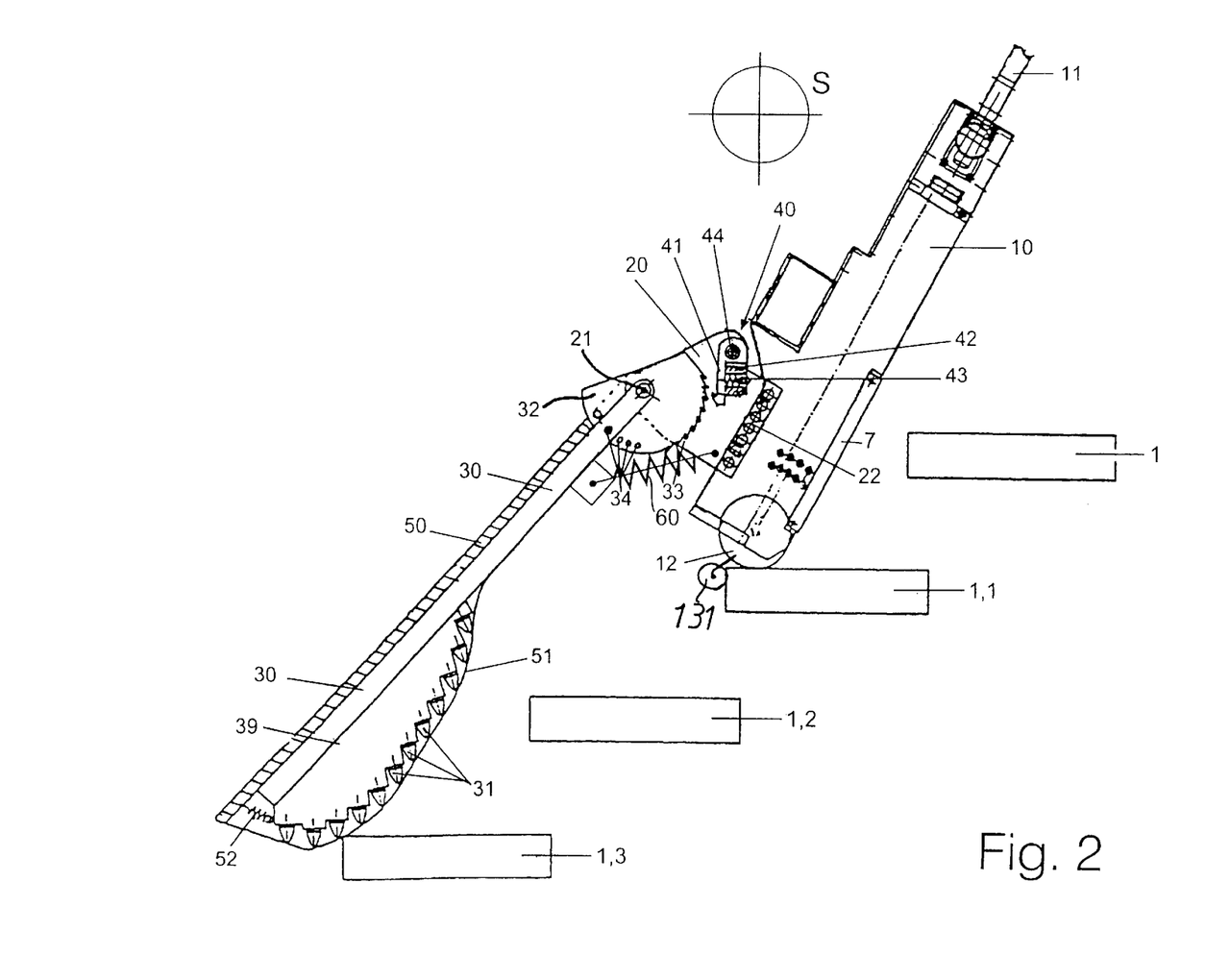

FIG. 2 shows in a schematic, partly broken illustration a safety device attached to the stair climbing device 10. The safety device has the task of preventing the combination of the stair climbing device 10, the wheelchair and the handicapped person from being able to fall down the stairs when the center of gravity S shifts too far forward.

The safety device first comprises a mounting device 20 that is attached to the stair climber 10. The attachment part 22 of the mounting device 20 can be easily adapted to the respective stair climber in such a way that the safety device can be added to all kinds of stair climbers.

A horizontal hinge pin 21 is provided on the mounting device 20; a support arm 30 is mounted freely rotating on it. The support arm 30 extends over just a few, e.g. one or two stairs 1. It is equipped at its free end with numerous nonskid support feet 31 that are mounted on a strut 39 in such a way that in case of danger, they are supported roughly vertically on the stepping surface of a stair 1.

While the support arm 30 under normal circumstances must be fully and freely movable relative to the mounting device 20 or the stair climbing device 10, in case of danger it must be immediately blocked. A braking and blocking device 40 serves this purpose. In the present example, it consists of a ratchet wheel 32 and a ratchet 41, 42. The ratchet wheel 32 is attached to the support arm 30, and the angle between the ratchet wheel 32 and the support arm 30 can be adjusted if necessary. Bores 34 are provided for this.

The ratchet 41, 42 is suspended freely swinging from the mounting device 20 around a horizontal axle 44. As long as the stair climbing device 10 is leaned properly backward, the ratchet wheel 32 and the ratchet 41, 42 are at a certain distance from each other. As soon as the stair climbing device 10 straightens up, the distance between the ratchet 41 and the ratchet wheel 32 shortens according to a sinus function until the ratchet 41 finally engages the teeth 33 of the ratchet wheel 32. The support arm 30 is thereby blocked and the stair climbing device cannot straighten up any further. If the operator leans the stair climbing device 10 properly backward again, the ratchet 41 is released from the ratchet wheel 32 and the support arm 30 is able to move freely.

As FIG. 2 shows, the ratchet consists of a first, light part 41 that has the ratchet tooth, and a second, heavy part 42 that is responsible for the constant vertical position due to gravity. Both parts 41, 42 are connected via a light spring 43. Due to this two-part construction, the ratchet tooth on the light ratchet part 41 can very quickly engage the ratchet wheel teeth 33.

A runner 50 with U-shaped cross-section is inverted via the support arm 30 and the support feet 31. A draw spring 52 pulls the support arm 30 into the runner 50. The front surface 51 of the runner 50 is shaped in such a way that under normal circumstances the support feet 31 disappear behind the front surface 51. In this way, only the front surface 51 slides on the edges of the stairs. If the front edge 51 is coated with an easily sliding material, the stair edges are protected.

However, the draw spring 52 is weak enough to ensure that in case of danger, the support feet 31 can be immediately supported—sitting largely vertically—on the stepping surface of the next stair 1.

An additional support spring 60 is provided between the mounting device 20 and the support device 30. It is sized in such a way that it is powerless when the stair climber 10 has the properly inclined position relative to the stairway 1. If the stair climber 10 changes its position forward or backward, the support spring 60 pulls or pushes the stair climber 10 back into the proper position. In this way, the operator of the stair climber 10 is relieved of force.

Figure 3:
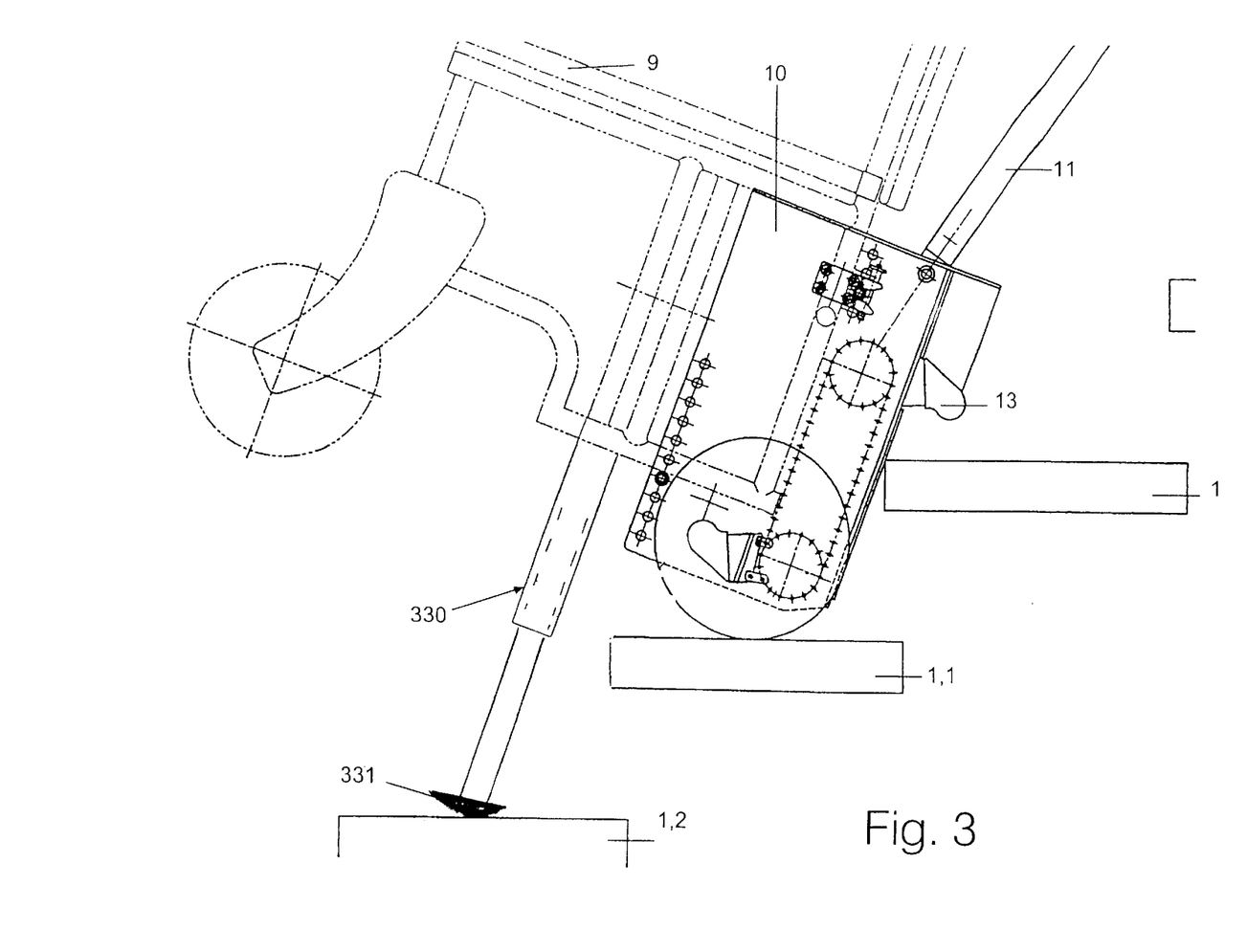

FIG. 3 shows a second example of a execution. The stair climber 10 and the wheelchair 9 correspond to what has been previously described. A support device 330 is provided in the form of a telescoping foot 331. The braking and blocking system 40 is a lockable tension bar 51 of finite length between the support device 330 and the mounting device 20 or the stair climber 10. The attachment of the support device 330 to the wheelchair 9 should be considered an example; in practical experience the support device 330 is primarily attached to the stair climber 10. The rigid attachment of the support device 330 should also only be considered an example; in practical experience the support device 330 will also be provided with a swivel mounting, comparable to that of FIG. 2.

Figure 4:
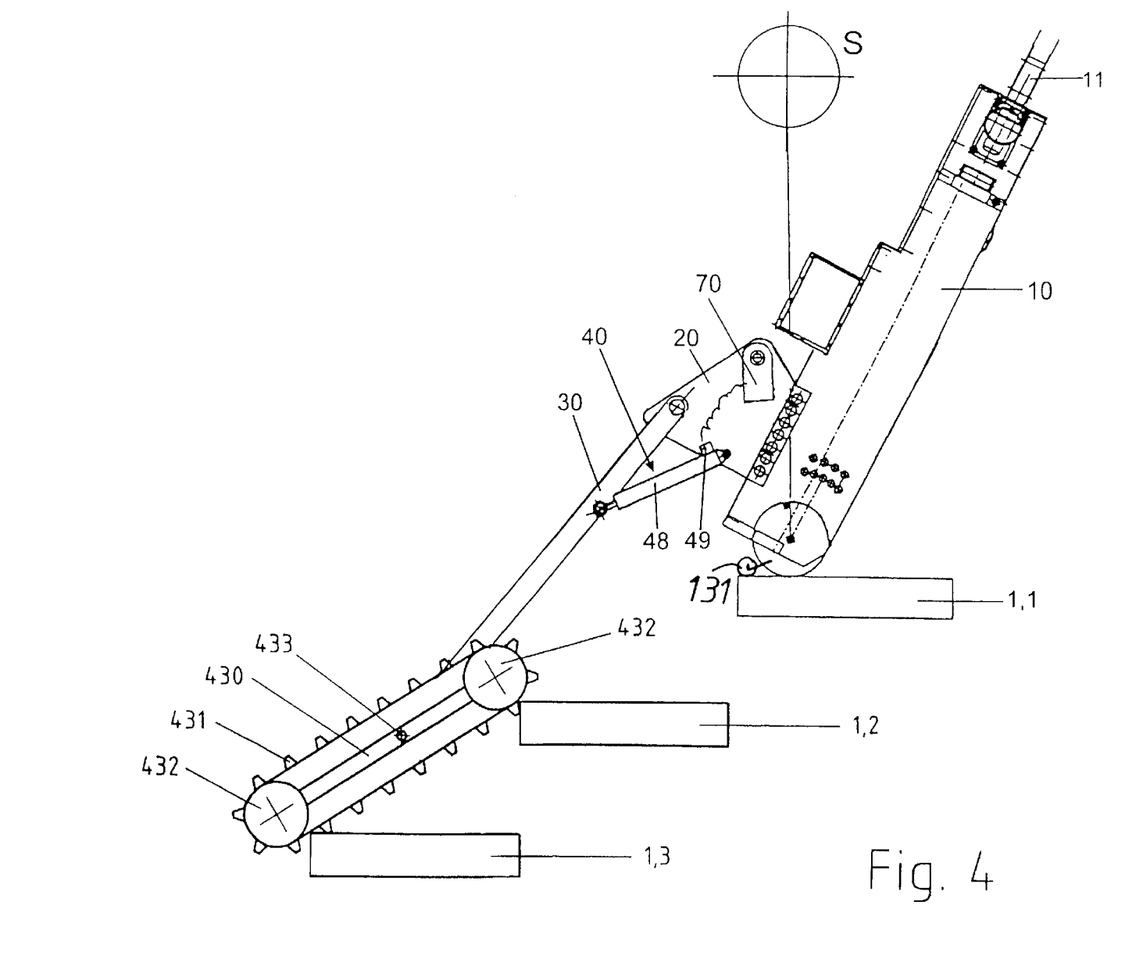

FIG. 4 shows another form of construction of a stair climber 10 with support device 30 and braking and blocking system 40. The latter, in this example of execution, consists of a lockable cylinder piston unit 48 with internal fluid circuit and an electrically controllable check valve 49 in the fluid circuit. The position of the stair climber 10 on the stairway 1 is measured with the help of an electromechanical heeling sensor 70 that transmits a blocking signal to the check valve 49 when the stair climber 10 assumes a dangerous position.

As an alternative to the aforementioned forms of execution, a subframe 430 is mounted at the end of the support device 30 by means of a swivel bearing 433. It bears a continuous creeper band 430 that runs over two deflection wheels 432 and is short enough that it only bridges over two stairs 1.2, 1.3. The movements of the creeper band 431 are blocked via sensors (not illustrated) and feelers and released in such a way that the stair climbing action is carried out very safely.

The creeper band 431 can obviously be driven by a drive motor housed in the subframe 430. In this way, it supports the lift mechanism of the stair climber 10 in such a way that heavy loads can also be conveyed up and down the stairs without noteworthy vibrations and very safely due to the three-point support on the stairway 1. This is particularly true when the lift mechanism of the stair climber 10 is equipped with the same crawlers.

Figure 5:
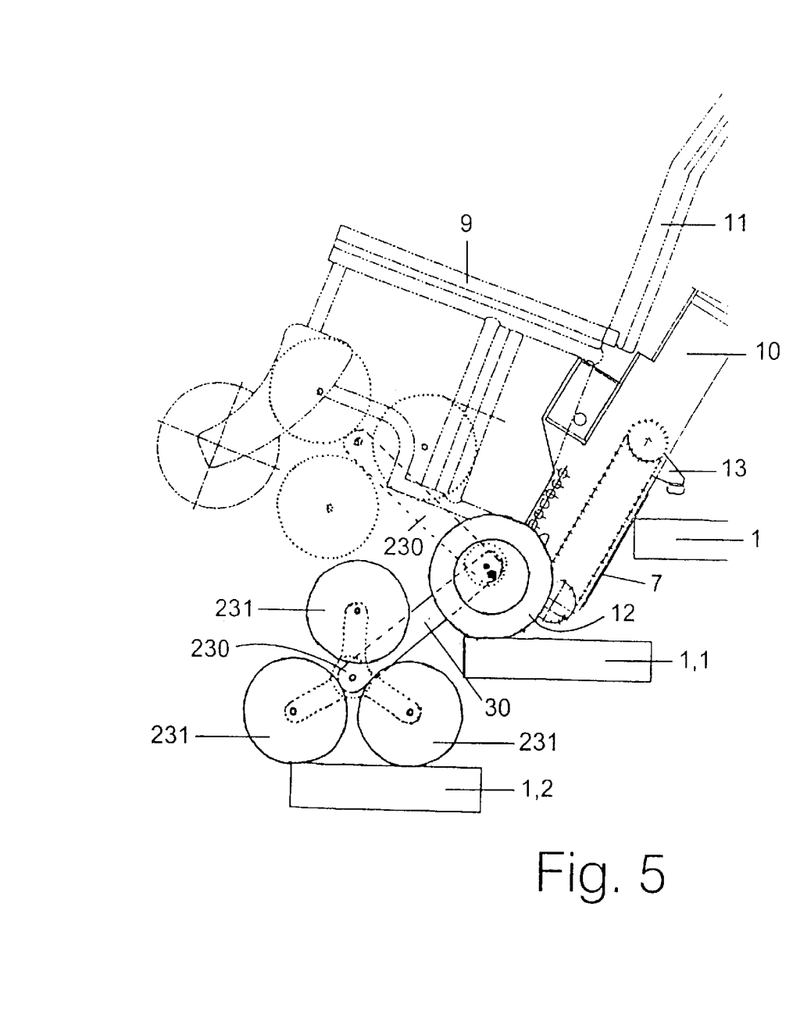

FIG. 5 shows a stair climber whose support device 30 bears a three-arm turnstile 230 with three support wheels 231. The support wheels 231 are supported on the stepping surface of the stair 1.2. If the turnstile 230 is motor-driven and the speed is synchronized with the lift mechanism 13 the stair climber 10, the wheelchair 9 is once again conveyed up and down the stairs problem-free and practically without vibrations. The braking and blocking system 40 is an electrical coupling 45.

Figure 6:
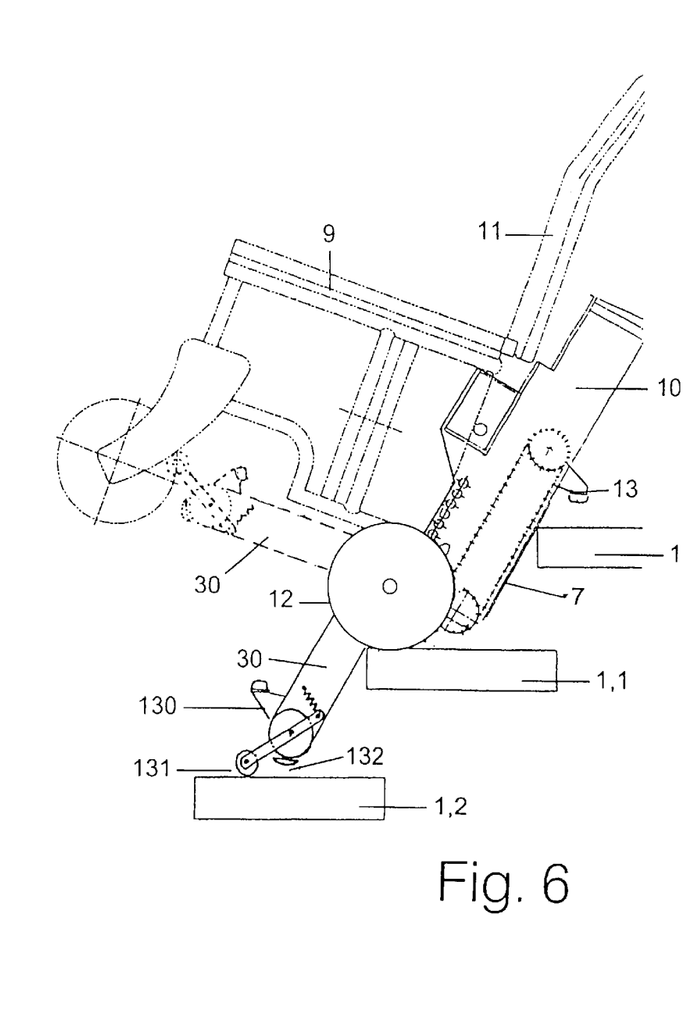

FIG. 6 shows a further variant of a stair climber 10 with paternoster-like lift mechanism 13 and a support device 30 that is also equipped with a paternoster-like lift device 130. A jockey roller 131 and a feeler 132 are used as the control and safety switch for the lift device 130. When the lift mechanism 13 on the stair climber 10 and the lift device 130 on the support arm 30 are properly coordinated, the two lift mechanisms run synchronously and the wheelchair 9 with the handicapped person is conveyed up and down the stairs practically without any function-related tipping movements. Thanks to the braking and blocking system 40 still present, in this case a shoe brake 46, however, in this case as well the support device 30 is immediately blocked when the said climber 10 straightens up dangerously and threatens to fall over the stairway 1. It is clear that the lift mechanisms 13, 130 are stopped immediately in such a case.

Figure 7:
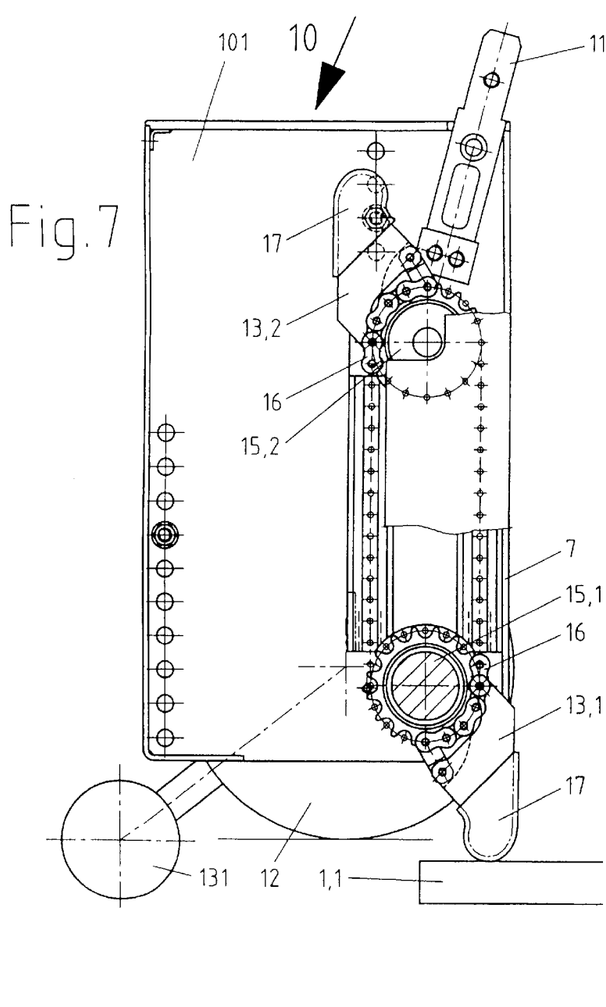
Figure 8:
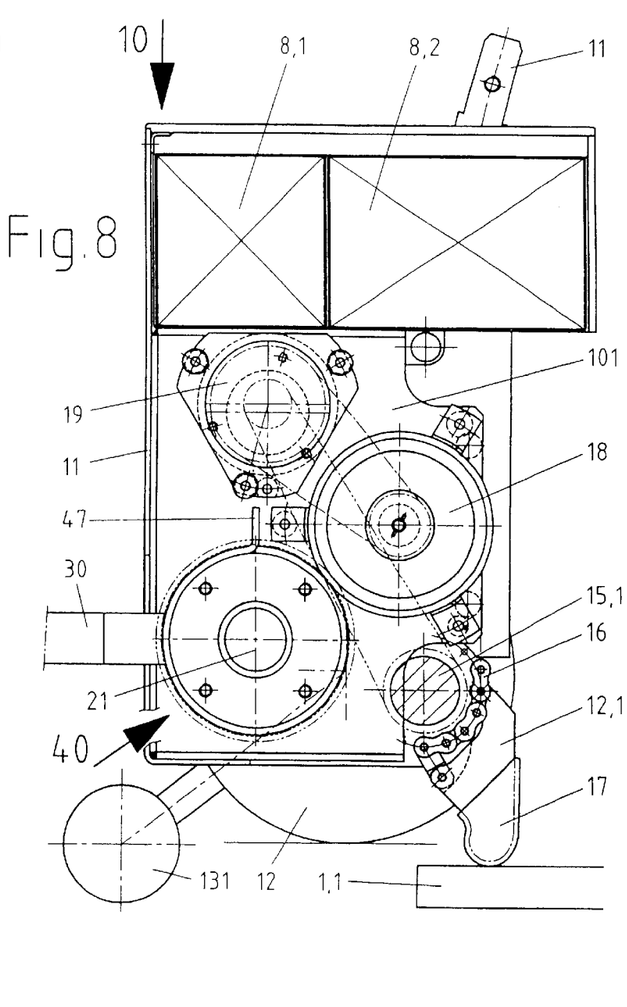
Figure 9:
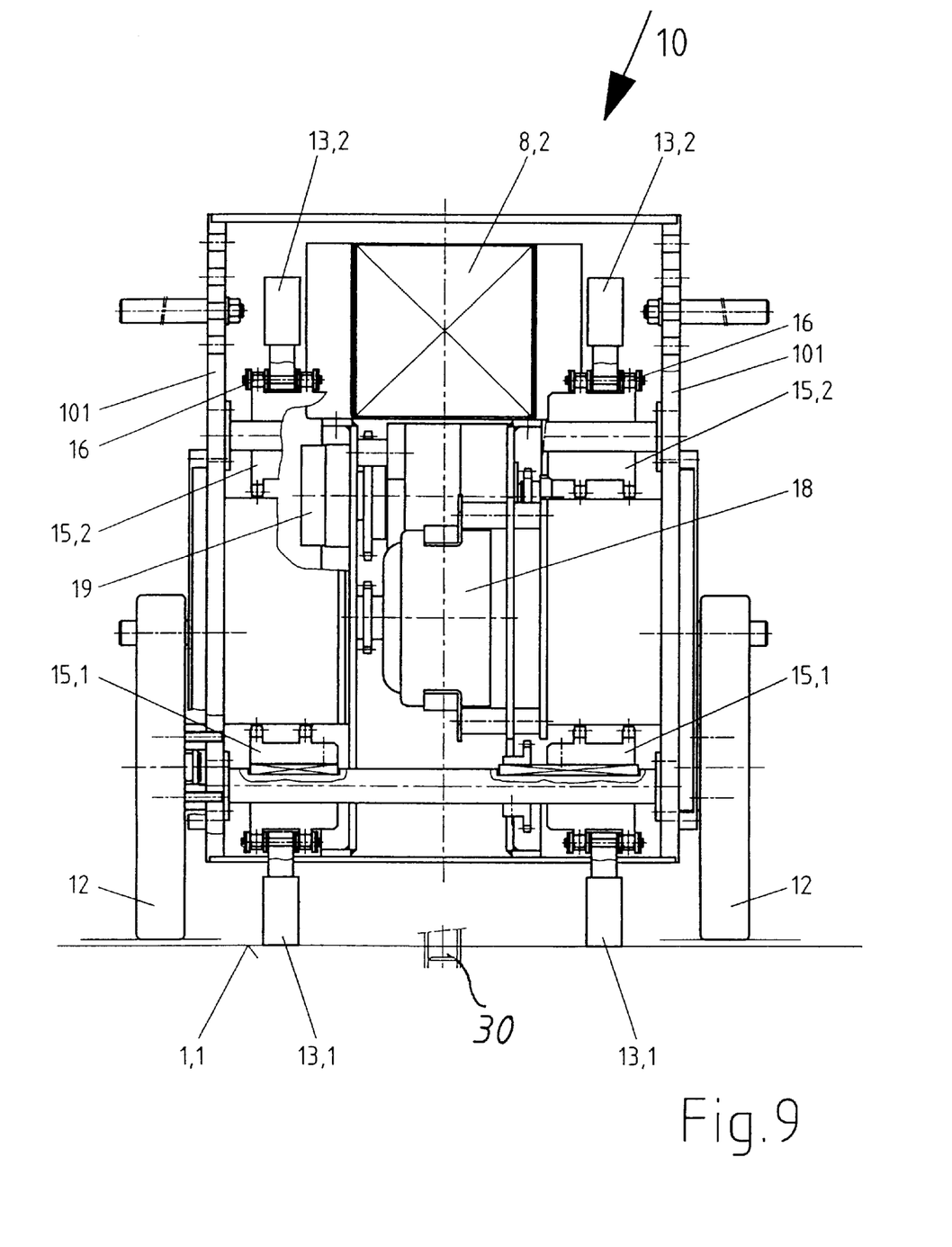

FIGS. 7, 8 and 9 show, in a partly broken side view, a vertical section and a rear view, the paternoster-like lift mechanism of the stair climber 10 of FIGS. 1, 3, 5 and 6 enlarged. A powerful frame 101 can be seen in which horizontal shafts one above the other are mounted with chain wheels 15.1, 15.2. Continuous chains 16 run on the right and left over the chain wheels 15.1, 15.2. Two foot elements 13.1, 13.2 are attached to them. These stand with a rounded edge on the stair 1.1 and are equipped with a nonskid, stairway-protecting coating 17. As the figures show, the foot elements 13.1, 13.2 are long enough that the running wheels 12 of the stair climber lift up from the stair 1.1 and lift the stair climber 10 over the edge of the stair 1.1.

The drive for the chains 16 is brought about by an electric motor 18 (FIG. 8) via a set of gears 19. The electric motor 18 is supplied with electric power by accumulators 8.1, 8.2 carried along.

FIG. 8 also shows the hinge pin 21 on which the support device 30 is mounted swiveling. In this case, a spring band brake 47 is provided as the braking and blocking system 40 that is attached to the stair climber 10 on the one hand and to the support arm 30 on the other hand. Spring band brakes are commercially available and distinguish themselves by particular operational reliability. Due to their construction, they already have the required free-wheeling operation. In case of danger the spring band brake 47 is activated by the heeling sensor 70 in this case as well.

What is claimed is:

1. Motor-driven stair climbing device for conveying equipment and goods attached removably to the stair climber, comprising a stable frame, and therein
   a source of electric power,
   a drive source
   a drive control,
   feelers and sensors
   and a stair climbing lift mechanism,
   running wheels on the frame, with which the stair climber stands or moves, and an unlockable free-wheeling hub in the running wheels, characterized by a support device swiveling relative to the stair climber for support on a stair,
   a braking and blocking system for stopping the support device that is controlled by the sensor in such a way that the support device is blocked relative to the stair climber when the stair climber threatens to tilt over the stairway.

2. Stair climbing device according to claim 1, wherein the support device is attached to the stair climber.

3. Stair climbing device according to claim 1, wherein the support device executes a linear lift movement.

4. Stair climbing device according to claim 1, wherein the support device comprises a telescoping foot.

5. Stair climbing device according to claim 1, wherein the support device comprises a scissor leg.

6. Stair climbing device according to claim 4, wherein the support device comprises at least two feet or scissor legs.

7. Stair climbing device according to claim 1, wherein the support device is mounted on the stair climber via a mounting device equipped with a hinge pin, the braking and blocking system is attached to the support device on the one hand and to the mounting system on the other hand, and the sensor controls the braking and blocking system in such a way that the support device is released as long as the stair climber maintains a proper inclination relative to the stairway.

8. Stair climbing device according to claim 1, wherein mechanisms attached in the lower end area of the support device provide support impacting largely vertically on the stepping surface of the stairs.

9. Stair climbing device according to claim 8, wherein support feet are attached to the support device, and in case of danger one of them is supported on the stair.

10. Stair climbing device according to claim 8, wherein a continuous creeper band is attached at the free end of the support device.

11. Stair climbing device according to claim 8, wherein a turnstile with at least two support wheels is attached at the free end of the support device.

12. Stair climbing device according to claim 8, wherein a paternoster lift mechanism is attached to the support device.

13. Stair climbing device according to claim 3, wherein the foot, the scissor leg, the creeper band, the turnstile, the paternoster, or any combination thereof are motor-driven, the drive is synchronized with the lift mechanism of the stair climber.

14. Stair climbing device according to claim 1, wherein the sensor is pendulum mounted on the stair climber or on the wheelchair.

15. Stair climbing device according to claim 1, wherein the braking and blocking system comprises of a ratchet wheel and a ratchet.

16. Stair climbing device according to claim 15, wherein the center of the ratchet wheel is situated in the center of the hinge pin, the ratchet is designed as a pendulum and mounted swinging from an axle on the mounting system.

17. Stair climbing device according to claim 15, wherein the ratchet comprises of a high-mass part and a low-mass part, a spring draws both parts together.

18. Stair climbing device according to claim 1, wherein the braking and blocking system comprises a lockable tension bar of finite length between the support device and the mounting device or the stair climber.

19. Stair climbing device according to claim 1, wherein a shoe brake is provided as the braking and blocking system.

20. Stair climbing device according to claim 1, wherein a spring band brake is provided as the braking and blocking system.

21. Stair climbing device according to claim 1, wherein an electric coupling is provided as the braking and blocking system.

22. Stair climbing device according to claim 1, wherein a lockable cylinder piston unit is provided as the braking and blocking system.

23. Stair climbing device according to claim 22, wherein the cylinder piston unit comprises an internal fluid circuit and in the fluid circuit, a check valve controlled by the sensor.

24. Stair climbing device according to claim 1, wherein a support spring is provided parallel to the braking and blocking system, the support spring is powerless when the stair climbing device is properly inclined relative to the stairway.

25. Stair climbing device according to claim 1, wherein a drive is provided parallel to the braking and blocking system, the drive is controlled based on the differences between the desired and actual values of the position of the support device relative to the stair climber, the pressure force of the support device on the stairway, or any combination thereof.

26. Stair climbing device according to claim 25, wherein the drive and the braking and blocking system are integrated.

27. Stair climbing device according to claim 1, wherein the lift mechanism comprises a continuously creeper band that only reaches over two stairs, the drive source comprises an electric motor with a set of gears.

28. Stair climbing device according to claim 27, wherein the creeper band and the drive source are mounted in a subframe, the subframe is mounted swiveling on the frame of the stair climber.

29. Stair climbing device according to claim 1, wherein the lift mechanism comprises two turnstiles mounted on the sides of the frame with at least two running wheels, the drive source comprises an electric motor with a set of gears.

30. Stair climbing device according to claim 1, wherein the lift mechanism comprises a straight-line mechanism, a lift frame mounted movably on the straight-line mechanism, at least one flap mounted on the lift frame and able to swing in and out, at least one continuous chain driven by the drive source, a push lever between the chain and the flap, support feet of a nonskid, stairway-protecting material on the lower edge of the flap.

31. Stair climbing device according to claim 30, wherein the drive source comprises an electric motor with a set of gears.

32. Stair climbing device according to claim 1, wherein the lift mechanism comprises two continuous chains circling parallel and in paternoster motion, at least one foot element on each chain, the drive source comprises an electric motor with a set of gears;

the foot elements can stand up on the stairway.

33. Stair climbing device according to claim 32, wherein the foot elements stand with a rounded edge on the stairway.

34. Stair climbing device according to claim 32, wherein the foot elements comprise a nonskid, abrasion-proof coating.

35. Stair climbing device according to claim 34, wherein feelers on the wheels or feelers in or on the frame measure the correct position of the stair climber (10) on the stairway (1).

36. Stair climbing device according to claim 30, wherein sensors measure the upper and lower end position of the flap, the lift frame or the foot elements.

37. Stair climbing device according to claim 1, wherein a microprocessor-controlled process control activates the drive source and the drive in the support device in the proper order and speed.

* * * * *